S. C. FANCHER & W. W. JUDSON.
SAD-IRON.

No. 185,091.          Patented Dec. 5, 1876.

WITNESSES:
Francis McArdle
John Goethals.

INVENTOR:
W. W. Judson
BY S. C. Fancher.
ATTORNEYS.

UNITED STATES PATENT OFFICE.

SALATHIEL C. FANCHER AND WILLIAM W. JUDSON, OF KANSAS CITY, MO.

IMPROVEMENT IN SAD-IRONS.

Specification forming part of Letters Patent No. 185,091, dated December 5, 1876; application filed September 22, 1876.

*To all whom it may concern:*

Figure 1:
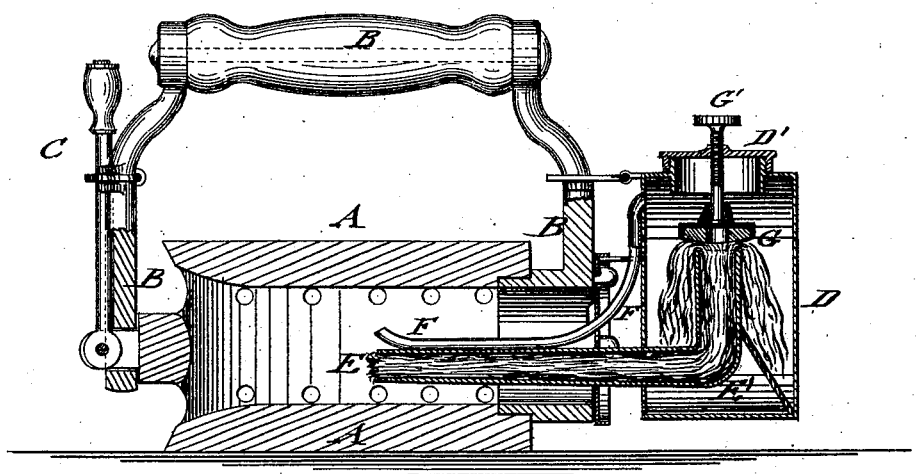
Figure 2:
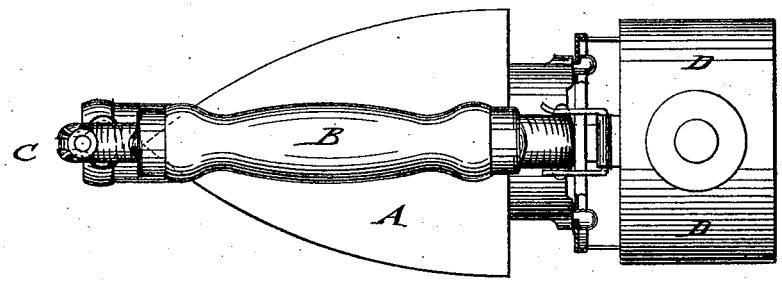
Figure 3:
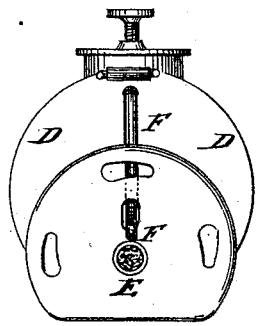

Be it known that we, SALATHIEL C. FANCHER and WILLIAM W. JUDSON, of Kansas City, in the county of Jackson and State of Missouri, have invented a new and Improved Sad-Iron, of which the following is a specification:

In the accompanying drawing, Figure 1 represents a vertical longitudinal section of our improved sad-iron; Fig. 2, a plan view of the same; and Fig. 3, a front view of the lamp, detached from the iron.

Similar letters of reference indicate corresponding parts.

Our invention relates to an improved reversible and self-heating sad-iron, in which the flow of alcohol from the lamp to the burner is regulated, and the gas-vapors generated in the alcohol-receptacle conducted off to the burner for combustion, so as to prevent the forcing of the alcohol to the burner faster than required, and avoid, also, any danger of fire arising from alcohol running out of the sad-iron on the articles to be ironed.

The invention consists in the construction and arrangement of parts, which will be hereinafter more fully described, and then pointed out in the claim.

In the drawing, A represents a reversible sad-iron, that turns in bearings of the handle B by means of a swinging-lever handle C, which also locks the iron after it is reversed, as shown in Fig. 1. The alcohol-lamp D is locked in suitable manner to the end of the sad-iron, in which position its burner E extends to about the center of the hollow interior space of the iron. The wick-tube E' is bent in the lamp or fluid-receptacle D in upward direction from the horizontal burner, and the wick spread around the end of the wick-tube, to take up and conduct the alcohol or other fluid to the burner. The gas generated in the lamp D by the heat of the sad-iron is conducted off from the lamp by a tube, F, that extends from a point near the top of the lamp to the interior of the sad-iron, running along the wick-tube to the burner, where it is consumed as fast as generated.

A disk or cap, G, of wood, rubber, leather, or other material, may be adjusted, by means of a screw-shank, G', and a center nut of the cap D' of lamp D, nearer to or farther from the end of the wick-tube, so as to press with greater or less power on the wick, and regulate thereby the flow of the fluid to the burner.

The gas-conducting tube, in connection with the regulating cap or disk of the wick, obviates the danger of a too great supply of alcohol to the burner by the pressure of the gas generated in the lamp, and the running out of the alcohol from the burner and sad-iron to the articles to be ironed, and the consequent danger of fire fully prevented.

Having thus described our invention, we claim as new and desire to secure by Letters Patent—

The tube F, combined with the receptacle D, tube E E', and the heating-chamber, to convey the gas generated in fluid-chamber to the burner, as and for the purpose specified.

SALATHIEL C. FANCHER.
WILLIAM W. JUDSON.

Witnesses:
J. W. JENKINS,
JAMES GIBSON.